United States Patent [19]

Feldmann et al.

[11] 3,966,838

[45] June 29, 1976

[54] POLYAMIDE BASE POWDER COATING MATERIAL

[75] Inventors: Rainer Feldmann; Wolfgang Kriesten; Karl Adolf Müller, all of Marl; Hans Joachim Panoch, Hullern; Heinz Scholten, Lippramsdorf, all of Germany

[73] Assignee: Chemische Werke Huls Aktiengesellschaft, Germany

[22] Filed: Apr. 24, 1973

[21] Appl. No.: 354,123

[30] Foreign Application Priority Data

May 5, 1972 Germany............................ 2222122

[52] U.S. Cl..................... 260/857 R; 260/27.5 AQ; 260/78 R; 260/849; 260/857 TW
[51] Int. Cl.².......................................... C08L 77/00
[58] Field of Search......... 260/849, 857 TW, 857 R, 260/72 N

[56] References Cited

UNITED STATES PATENTS

| | | | |
|---|---|---|---|
| 2,698,966 | 1/1955 | Stott et al. | 260/857 |
| 3,240,734 | 3/1966 | Vogel | 260/849 |
| 3,299,009 | 1/1967 | Bruck | 260/78 |
| 3,378,397 | 4/1968 | Silvestri | 260/849 |

*Primary Examiner*—Murray Tillman
*Assistant Examiner*—J. Ziegler
*Attorney, Agent, or Firm*—Gilbert L. Wells

[57] ABSTRACT

Polyamide base powder coating material from a polyamide having an average of about 8 – 11 aliphatic carbon atoms per carbonamide group and containing about 0.2 to 5 percent by weight of carbonamide groups having n-alkoxymethyl groups based on the total number of carbonamide groups and about 0.01 – 2 percent by weight of acid catalysts.

14 Claims, No Drawings

POLYAMIDE BASE POWDER COATING MATERIAL

CROSS REFERENCES TO RELATED APPLICATIONS

Applicants claim priority under 35 U.S.C. 119 for Application Ser. No. P 22 22 122.3 filed May 5, 1972 in the Patent Office of the Federal Republic of Germany. The disclosure of U.S. Application Ser. No. 283,966 filed Aug. 28, 1972 is incorporated herein.

Application Ser. No. 283,966 discloses a polylauryllactam powder prepared from polylauryllactam and a copolymer of polylauryllactam.

Applicants also incorporate herein the disclosure of assignee's copending Application Ser. No. 354,072, filed on the same day as the present application and having as inventors Rainer Feldmann et al, and entitled "Polyamide Base Powder Coating Material containing an Aminoplast carrying Alkoxyalkyl Groups."

BACKGROUND OF THE INVENTION

The object of the invention is polyamide powders for the coating of metals.

The state of the prior art of producing polyamide powders may be ascertained by reference to U.S. Pat. No. 2,698,966; 2,742,440; and 2,975,128 of Louis L. Stott; U.S. Pat. No. 3,203,822 of Junker et al; U.S. Pat. No. 3,410,832 of Griehletol; 3,299,009 of Stephen D. Bruck; and the Kirk-Othmer "Encyclopedia of Chemical Technology," 2nd Ed., Vol. 16 (1968), under the section "Polyamide (Plastics)", pages 88–105, particularly page 92 - polylauryllactam (nylon-12), and polyundecanamide (nylon-11), page 101 Solution Processes, and Powder Processing, pages 101–102, the disclosures of which are incorporated herein.

U.S. Pat. No. 2,698,966 discloses physical mixtures of different types of nylon powders produced by dissolving the nylon in organic solvents and precipitating the powdered particles. In Example 14 of U.S. Pat. No. 2,742,440, the solution of epsilon caprolactam in alcohol-water solution and its precipitation as a powder is disclosed. The dispersion of Teflon powder in a solution of epsilon caprolactam and the coprecipitation of the powders is disclosed in U.S. Pat. No. 2,975,128.

The flame spraying and fluidized bed coating of nylon on a metal base is disclosed in U.S. Pat. No. 3,203,822. U.S. Pat. No. 3,299,009 discloses the n-methoxymethylation of nylons, and U.S. Pat. No. 3,410,832 discloses the preparation of polymers and copolymers of lauryllactam.

It is known that one can use polyamide powder for the production of lacquer-like coatings of metals. The coating process may be carried out by fluidized bed, by flame spraying, or by electrostatic deposition. The polyamide powder is produced by precipitation of the powdered polyamide from solution (German Application laid open to the public S 28 05 39b22/04) or by grinding polyamide granules. Polylauryllactam can also be produced in the same manner and can be used in the same coating methods. Coatings produced by polylauryllactam exhibit serious faults, especially when relatively thick walled, sharp edged articles are coated, because of bulges of the coating on both sides of the sharp edges, and at the same time the edges themselves are insufficiently coated or not coated at all.

There is also a method known for the production of polylauryllactam in which the resin is precipitated from a solution of the same, together with 0.1 – 5 percent by weight with respect to the amount of polylauryllactam of a known plasticizer hydroxyl group containing compound and/or phosphoric acid ester. This powder produces substantially improved coatings on metals except that the edge coatings of thick metal articles are not entirely satisfactory. See German Patent (DT-AS) 1,669,821.

It is further known to include additives to polyamide powders such as monomers or oligomers containing isocyanate groups which react with the resin in the molten state to improve coating adherency. These additives do not, however, lead to adequate coatings for sharp edges or edges having a very small radius of curvature. See German Pat. (DT-AS 1,271,286).

It has been suggested to coat metals at high temperature using a copolyamide consisting of 30 – 90 percent by weight polylauryllactam and 70–10 percent by weight of a copolyamide of lauryllactam. This powder permits better edge covering of metal parts but must be employed in a narrow temperature range. See Patent Application Ser. No. 283,966, filed Aug. 28, 1972.

SUMMARY OF THE INVENTION

It was found that these disadvantages are avoided by using a polyamide powder with an average of 8 – 11 aliphatic connected carbon atoms per carbonamide group which contains 0.2 – 5 percent of the carbonamide group connected with n-alkoxymethyl groups with respect to the total number of the carbonamide groups and containing 0.01 to 2 percent by weight of an acid reacting catalyst.

As used in the present application, the terminology "polyamide powder with an average of 8 – 11 aliphatic connected carbon atoms" includes polylauryllactam, polyundecaneamide, polydecaneamide, polynonaneamide, polydodecamethyleneadipamide, polyhexamethylene dodecanic acid amide, mixtures and copolyamides thereof and mixtures and copolyamides thereof with a second polyamide selected from the group consisting of polycaprolactam, polyhexamethyleneadipamide, polyhexamethylenesebacamide, polyhexamethyleneagelaicacidamide, polycapryllactam, copolymers and mixtures thereof.

The preferred range of n-alkoxymethyl group concentration is 0.25 – 4 percent by weight with respect to the total number of carbonamide groups. It is a further advantage when n-methoxymethyl groups are present in the polyamide powder. Polylauryllactam and/or polyundecanamide are suitable for producing the powder of the invention. Furthermore, mixed polyamides or mixtures of homopolyamides or homopolyamides with mixed polyamides can be used so long as the mixture has an average of 8 – 11 aliphatic connected groups per carbonamide group. Preferable aliphatic groups are linear $CH_2$ groups, however, branched chain aliphatic groups are also operable. Mixtures containing, e.g., a small amount of polycaprolactam are suitable so long as the average content of carbon atoms per carbonamide group remains in the range of 8 – 11, perferably in the range of 9 – 11 carbon atoms. Polylauryllactam has, e.g., 11 aliphatic connected carbon atoms per carbonamide group.

The n-alkoxymethyl groups can be selected from specially prepared n-alkoxymethyl group containing polylauryllactam (nylon-12), polyundecanamide (nylon-11), polycaprolactam, polyhexamethylenadipamide (nylon 6–6), polydodecamethylenadipamide, polyhexamethylensebacamide (nylon 6–10), polyhexamethylenazelaic acid amide and polycapryllactam in which the required amount of polylauryllactam or polyundecanamide has been added.

The production of polyamide with substituted alkoxymethyl groups is achieved by the reaction of a polyamide with a single valent primary aliphatic alcohol, preferably methanol and formaldehyde. It is possible by a special method to substitute n-alkoxymethyl groups for the carbonamide groups of either a polylauryllactam solution or a solution of polyundecanamide. The solution serves to dissolve the solid polyamide and to promote adequate speed of the substitution reaction at the necessary temperature. A suitable compound for this purpose is, e.g., methoxymethylisocyanate which replaces the active H-atom of the carbonamide group of the polyamide. Another suitable compound is methylhemiformal which is one-half acetal of formaldehyde. Should polyamides containing n-alkoxymethyl groups, but otherwise free from acid catalyst be employed, these additives must be additionally added. One can in this case advantageously employ a mixture of equal parts by weight of a tris-alkylphenyl-phosphite and an ester consisting of the reaction product of 4-hydroxy-3,5-di-tertiary-butyl phenyl-propionic acid and an aliphatic alcohol which under the conditions employed in the coating process forms the catalytic active compound. While the single components are not operable, the combination is operable which can be ascertained by infrared spectroscopic analysis. In addition, these compounds provide excellent heat and aging resistance. Suitable tris-alkylphenyl-phosphites are those with alkyl groups of 1 – 16 carbon atoms, which groups can be either straight chain or branched chain. In addition to the preferred tris-alkylphenyl-phosphites one can advantageously use tris-nonylphenylphosphite and tris-alkyl or tris-aryl-phosphite. Mixtures of phosphoric acid esters, especially tri-phenyl-phosphite, tri-benzyl-phosphite, diphenyl-decyl-phosphite, dodecyl-phenyl-phosphite, triisododecylphosphite, tris-α-ethylhexyl phosphite, dinonyl-phenyl-phosphite, dibutyl-phenyl-phosphite, and tris-cyclohexyl-phosphite, are also useful.

Suitable esters comprising 4-hydroxy-3,5-ditertiary butylphenyl-propionic acid are those in which the alcohol component is aliphatic comprising between 1 – 18 carbon atoms, e.g., octadecyl alcohol, butyl alcohol, methyl alcohol, nonyl alcohol, decyl alcohol, especially the tetra-pentaerythrite ester. Both compounds are present to the extent of 0.05 – 1 percent by weight, preferably 0.1 to 0.6 percent by weight, with respect to the weight of the polyamide powder. By the expression "polyamide powder" it is meant the sum of both, the pure polylauryllactam or polyundecanamide plus n-alkoxymethyl substituted polyamides. Instead of the substituted propionic acid, acids of the general formula can be employed:

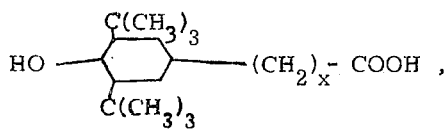

in which x can take a value of between 0 – 6. It is understood by the expression "combination of catalysts" is meant compounds in which both compound classes are present in a single molecule.

Further suitable acid catalysts are mineral acids such as phosphoric acid, polyphosphoric acid, boric acid or their acid ammonium or alkali salts such as monosodium phosphate, disodium phosphate, diammonium hydrogen phosphate. In addition, hydrochloric-, sulphuric- and sulfonic acids, including their salts such as ammonium chloride and ammonium sulfate, are operable for the purpose of the invention.

In addition, aliphatic mono- and dicarboxylic acids with 1 – 16 carbon atoms such as capronic acid, succinic acid, adipic acid, dodecanoic acid, fumaric acid, maleic acid, malonic acid, formic acid, acetic acid and oxalic acid are suitable. Lewis acids such as zinc chloride and magnesium chloride are also suitable. The above-mentioned mixture of both esters of phosphoric acids and the 4-hydroxy-3,5-di-tertiary-butylphenyl-propionic acid or the phosphoric- or polyphosphoric acid are preferred.

The above-mentioned catalysts are present in the polyamide powder to the extent of about 0.001 to 5 percent by weight. Usually 0.01 to 0.5 percent by weight will suffice. The required amount of acid catalyst varies with the strength of the acid and the equivalent weight of the catalyst. The acid catalysts are reactive with said polyamides at the temperature of film formation. Other catalysts are also operable excepting those which would chemically react with the polyamide, the solvents or other additives which reaction discolors the powder or coating. The polyamide containing the n-alkoxymethyl groups, to which the polylauryllactam or the polyundecanamide is to be added, has a substitution degree of from 30 – 60 percent. Advantageously these substituted polyamides should have the same viscosity as the pure polylauryllactam. However, the viscosity may vary above or below to a relative solution viscosity of between 0.1 and 0.5. In general, both substituted and non-substituted polyamides have a relative viscosity of between 1.3 and 2.2, more especially between 1.4 and 1.8. The viscosity is measured in a 0.5 percent meta-cresol solution at 25°C according to German Industrial Standard (DIN) 53727.

The polyamide used for the present invention can be made by the following methods:

A solution of polylauryllactam or polyundecanamide is mixed with
  a. n-alkoxymethyl group containing polyamide in a given amount in addition to the necessary amount of acid catalyst, or
  b. a n-alkoxymethyl group containing polyamide containing the acid catalyst from its production, or
  c. a compound which at the same time substitutes the polylauryllactam or the polyundecanamide in solution and from which the polyamide precipitates.

A variation in method (a) is that only in the presence of the heat involved in coating metals the acid catalyst is formed. Dimethylformamide or ethanol is a suitable solvent for polylauryllactam or polyundecanoicacidamide.

Furthermore, higher alcohol solvents such as ethylhexanol or n-hexanol, or cyclic ketones such as, e.g., cyclohexanone may be used. No bases are operable, however. Obviously, in method (c), no solvents are employed which during the introduction of the n-alkoxymethyl groups react with the polyamide. For example, for methoxymethyl isocyanate, solvents like alcohols with active hydrogen atoms cannot be used. Pigments such as TiO$_2$, carbon black, cadmium sulfide and heat stabilizers such as copper salts or manganese salts in ordinary quantities of from 0.1 to 2 percent by weight may be added.

The amount of solvent is not critical. One should choose only sufficient solvent to dissolve, at the operating temperature, the polyamide, the substituted polyamide and the soluble organic constituents such as acid catalyst, stabilizers or aging retardants. In general, for each 100 parts of the composition about 190 – 400, preferably 200 – 250 parts by weight solvent is required. The above-mentioned compounds are added to the solvent. It is also possible to first prepare a solution of polylauryllactam or polyundecanamide solution and heat the solution to about 100° – 180°C, preferably 130° – 160°C before adding the other constituents. The solution is stirred while adding salts or pigments in order to achieve uniform distribution. The solutions so prepared are finally cooled to 20° – 25°C in which, in general, a temperature fall of between 0.1° and 10°C per second is maintained. The precipitated powder which contains n-alkoxymethyl groups as well as acid catalyst in uniform distribution, is immediately ground under low pressure, and preferably is freed at a higher temperature from the residual solvent. In general, a pressure of 0.1 to 20 Torr (mm Hg) and a temperature of from about 20° – 100°C is used, and preferably a pressure of from 0.5 to 5 Torr (mm Hg) and a temperature of from 50° – 70°C is satisfactory.

The powder produced by this method has a particle size of from about 20 – 500 microns with a particle size distribution of about 85 percent between 60 and 200 microns. For electrostatic deposition one should advantageously use the powder of the lower range and for fluidized bed coating the powders of the medium range is desirable. It is also possible to mix the dry powdered polylauryllactam or dry powdered polyundecanamide, dry powdered n-alkoxymethyl group containing polyamide and the acid catalyst in the "dry blend method" if the catalyst is not already present. According to the teaching of (DT-AS) 1,669,821, one can by this method add powdered polylauryllactam or polyundecanamide by grinding to preserve the same.

The powders are especially suitable for the coating of metals by the fluidized bed method, as well as by flame spraying and by electrostatic deposition. Metal parts coated with the powders exhibit very good coating adherency, especially on the edges and flat thick portions which are uniformly and extraordinarily smooth coated in view of the presence of the n-alkoxymethyl groups which have a plasticizing effect. Very good edge coatings prevent abrasion of the same and prevent the concomitant corrosion of the metal article.

The n-methoxymethylated polyamides of the present invention are prepared as disclosed in U.S. Pat. No. 3,299,009, and they have carbonamide groups substituted to a degree of about 30 – 60 percent with n-methoxymethyl groups.

Examples of the overall combination of a powdered polyamide with an average of 8 – 11 aliphatic connected carbon atoms per carbonamide group containing carbonamide groups connected to n-alkoxymethyl groups and an acid catalyst include, in parts by weight, the following:

500 polylauryllactam, 2.5 polylauryllactam having 50 percent n-methoxymethyl groups and 10 phosphoric acid; 500 polylauryllactam, 2.5 polylauryllactam having 50 percent n-methoxymethyl groups and 2.5 trinonylphenyl phosphite and 2.5 3,5-ditertiary butyl-phenyl-propionic acid ester; 500 polylauryllactam, 22.5 polyauryllactam having 41 percent n-methoxymethyl groups and 2.5 adipic acid; 500 polylauryllactam, 20 polycaprolactam having 30 percent n-methoxymethyl groups and 2.5 diammoniumhydrogen phosphate; 500 polylauryllactam, 7.5 methoxymethylisocyanate and 2.5 ammonium chloride; 364.4 polyundecanamide, 35.6 polylauryllactam having 41 percent n-methoxymethyl groups, 2 triphenylnonyl phosphite and 2 3,5-ditertiary-butylphenyl-propionic acid-pentaerythrite ester; 384.8 mixed polyamide of lauryllactam and caprolactam in the ratio of 9 : 1, 15.2 polylauryllactam having 50 percent n-methoxymethyl groups, 2 triphenylnonyl phosphite and 2 3,5-ditertiary-butylphenyl-propionic acid-pentaerythrite ester.

The following specific examples illustrate preferred embodiments for carrying out the invention.

EXAMPLE 1.

500 grams of granulated polylauryllactam, 10 grams phosphoric acid, and 2.5 grams of n-methoxymethylpolylauryllactam containing 50 percent n-methoxymethyl groups having a relative solution viscosity $\eta$ rel. ~1.6 is mixed with 2000 grams of boiling dimethylformamide and cooled while stirring. Polylauryllactam powder precipitates out and is freed from solvent by filtering under vacuum. The precipitated polylauryllactam powder contains 0.25 percent of n-methoxymethyl groups with respect to the whole number carbonamide groups in addition to 1.99 percent by weight phosphoric acid. Coating of a sharp edged test body consisting of a steel block measuring 14 × 25 × 80 mm is carried out in a fluidized bed. The test bodies are preheated to about 260°C and immersed in the bed for 2 seconds followed by cooling in the air. The coatings were about 300 microns in thickness with uniformly coated sides and edges. The surface of the coating was smooth.

EXAMPLE 2.

500 grams polylauryllactam granules are dissolved in 950 grams dimethylformamide. Finally, 2.5 grams n-methoxymethylpolylauryllactam having 50 percent n-methoxymethyl groups and a relative solution viscosity of $\eta$rel ~1.6, as well as 2.5 grams trinonylphenyl phosphite and 2.5 grams 3,5-ditertiary butyl-phenyl-propionic acid tetrapentaerythrite ester are added to the mixture and quickly cooled. The precipitated gel is ground in a hammer mill and freed from solvent at 70°C at 5 Torr (mm Hg) pressure. Coated test bodies from the fluidized bed exhibited no edge bulges.

Good similar coatings were obtained when instead of 2.5 grams, 25 grams of n-methoxymethylpolylauryllactam with 50 percent alkoxy methyl groups and a relative solution viscosity of $\eta$rel. ~1.6 or 22.5 grams n-methoxymethylpolylauryllactam with 41 percent alkoxymethyl groups and a relative solution viscosity of $\eta$rel ~1.30 or 45 grams n-methoxymethylpolyauryllactam with 41 percent methoxymethyl groups and a relative solution viscosity of $\eta$rel ~1.30 or 20 grams n-methoxymethylpolylauryllactam with 33 percent methoxymethyl groups and a relative solution viscosity of $\eta$rel ~1.35 or 60 grams n-methoxymethylpolylauryllactam with 33 percent methoxymethyl groups and a relative solution viscosity of $\eta$rel ~1.35 are employed.

EXAMPLE 3.

The method of Example 2 is repeated except that instead of the ester 2.5 grams of a n-methoxymethylpolylauryllactam is used which from its production contains 0.01 – 2 percent by weight phosphoric acid. The powder was used in a fluidized bed and produced coatings with good edge covering and a smooth surface.

EXAMPLE 4.

The method of Example 3 is repeated where, instead of 2.5 grams of the phosphoric acid containing n-methoxymethylpolylauryllactam, 25.5 grams of a phosphoric acid free n-methoxymethylpolylauryllactam with 41 percent by weight alkoxymethyl groups and a relative viscosity of 1.30 is added and, the acid catalyst, 2.5 grams of adipic acid is used. The fluidized bed powder obtained produces good edge covering and the test bodies exhibited no bulges next to the edges. The same quality coatings are obtained when, instead of the adipic acid, 2.5 grams of diammoniumhydrogen phosphate or 2.5 grams of ammonium chloride is used.

EXAMPLE 5.

In the method of Example 2, instead of 2.5 grams of n-methoxymethylpolylauryllactam, 20 grams of n-methoxymethylpolycaprolactam with a n-methoxymethyl group content of about 30 percent with respect to the whole number of carbonamide groups and a relative viscosity of 1.6 is added. Using this powder in a fluidized bed also produced good edge coatings.

EXAMPLE 6.

According to the method of Example 2, instead of n-methoxymethylpolylauryllactam, 7.5 grams of methoxymethylisocyanate is substituted which reacted immediately in the solvent through the isocyanate group with the polyamide. The polylauryllactam powder contains 0.4 percent methoxymethyl group with respect to the total number of carbonamide groups. Good edge coatings were also obtained when employed in a fluidized bed.

EXAMPLE 7.

The method of Example 2 is repeated except that 37.5 grams of $TiO_2$ as a pigment is added to the polylauryllactam solution. The pigmented powder obtained produced good edge coatings. When one uses 2-ethylbutanol instead of dimethylformamide in this example equally good results were obtained.

EXAMPLE 8.

200 grams of polylauryllactam powder containing 1 gram of tris-nonylphenyl phosphite and 1 gram of 3,5-di-tertiarybutyl phenylpropionic acid-tetrapentaerythrite ester prepared by grinding from granules was mixed with 10 grams n-methoxymethylpolylauryllactam powder in a mixer or mixed in a fluidized bed. Good edge coatings were obtained by fluidized bed coating.

EXAMPLE 9.

The method of Example 2 was repeated. 364.4 grams of polyundecanamide ($\eta$rel ~1.55) and 35.6 grams n-methoxymethylpolylauryllactam (substituted 41 percent, $\eta$rel ~1.3) with 30 grams of $TiO_2$ pigment 100 grams dimethylformamide, 2 grams of triphenylnonyl phosphite and 2 grams of 3,5-ditertiary-butylphenyl-propionic acid pentaerythrite ester in 300 grams of dimethylformamide were dissolved and processed into powder suitable for use in a fluidized bed. Test articles showed no bulges near the edges with good edge coating and smooth surfaces.

EXAMPLE 10.

The method of Example 9 was repeated whereby instead of polyundecanamide, 384.8 grams of mixed polyamides of lauryllactam and caprolactam (in a ratio of 90 : 10) and 15.2 grams of n-methoxymethylpolylauryllactam (substituted degree 50 percent, $\eta$rel ~1.6) is added. The edge coating is good and the flat surfaces were smooth and glossy.

COMPARATIVE EXAMPLES

The polylauryllactam powder is made according to the method of Example 2 without the addition of n-methoxymethylpolylauryllactam. A sheet coated with this powder showed only poor or no coating at all on the edges. Both sides of the edge had bulges of polylauryllactam.

We claim:
1. Polyamide base powder compositions consisting essentially of a plurality of finely divided particles, said powder compositions comprising polyamides having carbonamide groups with an average of from 8 to 11 aliphatically linked carbon atoms per carbonamide group, about 0.2 to 5 percent of said carbonamide groups having n-alkoxymethyl groups attached to the nitrogen atoms of said carbonamide groups and about 0.01 to 2 percent by weight of acid catalysts reactive with said polyamides at the temperature of film forming, said polyamides selected from the group consisting of polylauryllactam, polyundecanamide, mixtures thereof and mixtures thereof with a second polyamide selected from the group consisting of polycaprolactam, polyhexamethylenadipamide, polydodecamethyleneadipamide, polyhexamethylensebacamide, polyhexamethyleneeagelaic acid amide, polycapryllactam, copolymers thereof and mixtures thereof.

2. The polyamide base powder coating compositions of Claim 1, wherein said n-alkoxymethyl groups are n-methoxymethyl groups.

3. The polyamide base powder coating compositions of Claim 2, wherein said carbonamide groups with connected n-methoxymethyl groups include polyamides with carbonamide groups substituted to a degree of about 30 – 60 percent with n-methoxymethyl groups, said polyamides selected from the group consisting of polylauryllactam, polycaprolactam, polyhexamethylene-adipamide, polyundecanamide and mixtures thereof.

4. The polyamide base powder coating compositions of Claim 2, wherein said acid catalysts are selected from the group consisting of monocarboxylic acids having 1 – 16 carbon atoms, dicarboxylic acids having 1 – 16 carbon atoms, Lewis acids, mineral acids, alkali salts of mineral acids, ammonium salts of mineral acids and mixtures thereof.

5. The polyamide base powder coating compositions of Claim 2, wherein said acid catalysts having a concentration about 0.05 – 1 percent by weight and are selected from the group consisting of trisalkylphenyl ester of phosphoric acid, trialkyl ester of phosphoric acid, trisaryl ester of phosphoric acid and mixtures of esters of phosphoric acids whose alkyl group contains 1 – 16 carbon atoms having straight chained or branched chains and about 0.05 – 1 percent by weight of an ester of 4-hydroxy-3,5-di-tertiary-butylphenyl monocarboxylic acid of the general formula

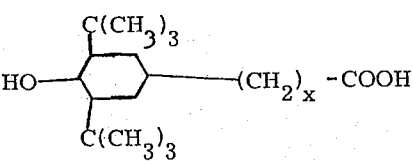

where x can take a value of between 0–6, with an aliphatic alcohol of 1–18 carbon atoms.

6. The polyamide base powder coating compositions of Claim 2, wherein said acid catalysts are a tetra-pentaerthrite ester of 4-hydroxy-3,5-di-tertiary-butyl phenyl-propionic acid having a concentration of about 0.1 – 1 percent by weight and a tris-nonyl-phenyl ester of phosphoric acid having a concentration of about 0.1 – 1 percent.

7. A method for producing a polyamide base powder for coating compositions comprising dissolving in an organic solvent at an elevated temperature polyamides having an average of about 8 – 11 aliphatic carbon atoms per carbonamide group, said polyamides selected from the group consisting of polylauryllactam, polyundecanamide, mixtures thereof and mixtures thereof with a second polyamide selected from the group consisting of polycaprolactam, polyhexamethylenadipamide, polydodecamethyleneadipamide, polyhexamethylensebacamide, polyhexamethylenagelaic acid amide, polycaproyllactam, copolymers thereof and mixtures thereof, said polyamides containing about 0.2 to 5 percent of carbonamide groups with connected n-alkoxymethyl groups based upon the whole number of carbonamide groups in the presence of about 0.01 – 2 percent by weight of acid catalysts to form a solution, cooling the solution to precipitate said base powder and separating said base powder from said solvent as a plurality of finely divided particles.

8. The method of Claim 7, wherein a n-alkoxymethyl group substituted polyamide with a substituted degree of about 30 – 60 percent is added to said solution in such quantity that the content of the n-alkoxymethyl groups is about 0.2 – 5 percent with respect to the total number of carbonamide groups present.

9. The method of Claim 8, wherein a n-methoxymethyl group substituted polyamide is added.

10. The method of Claim 8, wherein a phosphoric acid free substituted polyamide is added in addition to said 0.01 to 2 percent by weight phosphoric acid as an acid catalyst.

11. The method of Claim 8, wherein said catalysts are a mixture of about 0.05 to 1 percent by weight of a compound selected from the group consisting of a tris-alkylphenyl ester of phosphoric acid, a tris-alkyl ester of phosphoric acid, a tris-aryl ester of phosphoric acid or a mixture of esters of phosphoric acid whose alkyl group has 1 – 16 carbon atoms and is either straight chained or branched chained and about 0.05 to 1 percent by weight of an ester of 4-hydroxy-3,5-di-tertiary-butylphenylmono-carboxylic acid of the general formula

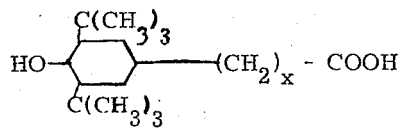

where x can take a value of 0 – 6 with an aliphatic alcohol of 1 – 18 carbon atoms.

12. The method of Claim 8, wherein said organic solvent is selected from the group consisitng of dimethylformamide, ethanol, ethylhexanol, n-hexanol and cyclohexanone.

13. Polyamide base powder compositions consisting essentially of a plurality of finely divided particles, said powder compositions comprising polyamides having carbonamide groups with an average of from 8 to 11 aliphatically linked carbon atoms per carbonamide group, about 0.2 to 5 percent of said carbonamide groups having an alkoxy methyl group attached to the nitrogen atom of said carbonamide groups and about 0.01 to 2 percent by weight of acid catalysts reactive with said polyamides at the temperature of film forming.

14. The polyamide base powder coating compositions of Claim 13 wherein said finely divided particles have a particle size of about 20 to 500 microns.

* * * * *